US010826696B2

(12) United States Patent
Loiseau et al.

(10) Patent No.: US 10,826,696 B2
(45) Date of Patent: Nov. 3, 2020

(54) CRYPTOGRAPHIC METHOD ON BINARY EDWARDS ELLIPTIC CURVES

(71) Applicant: COMMISSARIAT A L'ENERGIE ATOMIQUE ET AUX ENERGIES ALTERNATIVES, Paris (FR)

(72) Inventors: Antoine Loiseau, Grenoble (FR); Jacques Fournier, Simiane-Collongue (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 102 days.

(21) Appl. No.: 16/127,390

(22) Filed: Sep. 11, 2018

(65) Prior Publication Data

US 2019/0081786 A1 Mar. 14, 2019

(30) Foreign Application Priority Data

Sep. 13, 2017 (FR) .................................... 17 58474

(51) Int. Cl.
*H04L 29/06* (2006.01)
*H04L 9/30* (2006.01)

(52) U.S. Cl.
CPC ........ *H04L 9/3066* (2013.01); *H04L 2209/12* (2013.01)

(58) Field of Classification Search
CPC ........................ H04L 9/3066; H04L 2209/12
See application file for complete search history.

(56) References Cited

U.S. PATENT DOCUMENTS

| 9,417,847 | B2 * | 8/2016 | Gashkov | ............... G06F 30/327 |
| 9,590,805 | B1 * | 3/2017 | Parkinson | ............ H04L 9/3247 |
| 2017/0169735 | A1 * | 6/2017 | Lablans | ................ H04L 9/3013 |

OTHER PUBLICATIONS https://binary.cr.yp.to/bbe-20090604.pdf|Batch Binary Edwards|Daniel J. Bernstein| Jun. 2009|pp. 2-20 (Year: 2009).*
https://math.uncc.edu/sites/math.uncc.edu/files/fields/preprint_archive/paper/2013_06.pdf|Binary Edwards curves in elliptic curve cryptography|2013| Graham Enos|pp. 1-145 (Year: 2013).*
French Preliminary Search Report dated May 11, 2018 in French Application 17 58474 filed on Sep. 13, 2017 (with English Translation of Categories of Cited Documents).
Brian Koziel, et al., "Low-Resource and Fast Binary Edwards Curves Cryptography," ECCV 2016 Conference , Springer International Publishing Switzerland, Nov. 2015, pp. 347-369.

(Continued)

*Primary Examiner* — Mahfuzur Rahman
(74) *Attorney, Agent, or Firm* — Oblon, McClelland, Maier & Neustadt, L.L.P.

(57) ABSTRACT

The invention relates to a cryptographic method on a binary Edwards curve (BEC) by a binary extension field $\mathbb{F}_{2^m}$, the domain parameters of which are selected to enable an implementation adapted to a 32-bit or 64-bit hardware architecture to reduce the number of calculations and to guarantee a high security level against attacks. A list of binary extension fields is provided with associated primitive polynomials. For each of these binary extension fields, at least one optimum parameter of the BEC curve is disclosed with an optimum generating point.

3 Claims, 1 Drawing Sheet

(56) References Cited

OTHER PUBLICATIONS

Daniel J. Bernstein, "Batch binary Edwards," ECCV 2016 Conference, Springer International Publishing, Aug. 2009, pp. 1-21.
Reza Rezaeian Farashahi, et al., "Differential Addition on Binary Elliptic Curves," ECCV 2016 Conference, Springer International Publishing, Mar. 2017, pp. 21-35.
Daniel J. Bernstein, et al., "Binary Edwards Curves," pp. 1-19.
Darrel Hankerson, et al., "Guide to Elliptic Curve Cryptography," Springer International Publishing, 330 Pages.
U.S. Appl. No. 15/510,425, filed Mar. 10, 2017, US-2017-0310688-A1, Maxime Lecomte, et al.
U.S. Appl. No. 16/054,291, filed Aug. 3, 2018, Maxime Montoya, et al.

\* cited by examiner

CRYPTOGRAPHIC METHOD ON BINARY EDWARDS ELLIPTIC CURVES

TECHNICAL DOMAIN

This invention relates to the field of cryptography in general and more particularly to cryptography on elliptic curves. It is particularly applicable in the field of the Internet of Things (IoT).

STATE OF PRIOR ART

Elliptic Curve Cryptography (ECC) is an encryption technique that is economic in key length and calculation time, which makes it particularly attractive for use in Internet of Things nodes that are inherently poor in resources.

Cryptography on elliptic curves takes advantage of the difficulty in solving the Discrete Logarithm Problem (DLP) on a finite cyclic group. For example, considering the multiplication group of a finite field $\mathbb{F}_q$ (in the remainder of this presentation, $\mathbb{F}_q$ or GF(q) will be used to denote a finite field with $q=p^m$ elements in which p is a prime number and m is a non-null integer), this group is cyclic and the discrete logarithm problem z in the base x can be defined as the search for the smallest integer k such that $x^k=z$ in which x, $z \in \mathbb{F}_q^*$.

In general, an elliptic curve E on a field $\mathbb{k}$ is defined from a cubic with two variables x, y taking their values from inside this field, namely the set of points (pairs of elements of $\mathbb{k}$) satisfying the Weierstrass equation:

$$y^2+a_1xy+a_3y=x^3+a_2x^2+a_4x+a_6 \quad (1)$$

in which $a_1, \ldots, a_4, a_6 \in \mathbb{k}$. The set of these points, together with a point $\Omega$, called the point at infinity, defines an elliptic curve on the field $\mathbb{k}$, denoted $E(\mathbb{k})$. An affine addition operation is constructed on $E(\mathbb{k})$ such that $E(\mathbb{k})$ on which this operation is performed forms an additive group. For a point G belonging to $E(\mathbb{k})$, the set of elements $\ell G$ in which $\ell$ is integer is than a cyclic sub-group of $E(\mathbb{k})$. In practice, the multiplication of a point of $E(\mathbb{k})$ by a scalar (for example $\ell$), also called exponentiation by analogy with a multiplication group, is broken down into elementary doubling (calculation of 2G) and addition operations that are easier to perform.

Considering the case of a finite field $\mathbb{k} = \mathbb{F}_q$, cryptosystem on elliptic curve on $\mathbb{F}_q$ is characterised by a set of parameters, $(q, a_1, \ldots, a_4, a_6, G, n, h)$, also called domain parameters, in which q, $a_1, \ldots, a_4, a_6$ are previously defined parameters, G is a generating point, n is the order of G in the additive group $E(\mathbb{F}_q)$, $$h = \frac{|E(\mathbb{F}_q)|}{n}$$

is the cofactor of G in this group, $|E(\mathbb{F}_q)|$ is the order of the group $E(\mathbb{F}_q)$.

A private key d can then be chosen from among the integers $[1, n-1]$, the corresponding public key being given by the coordinates $Q=dG$. The search for the private key from the public key and the generating point G, or Elliptic Curve Discrete Logarithm Problem (ECLDP) is more difficult that the DLP problem on finite fields and, in the current state, is impossible to solve in polynomial time.

A presentation of cryptography on elliptic curves is given in the book by D. Hankerson, A. Menezes and S. Vanstone entitled "Guide to Elliptic Curve Cryptography" published in 2004 by Springer Publishing.

In practice, the curves currently used in cryptography on elliptic curves belong to the family of Weierstrass curves given by (1) in which $\mathbb{k}$ is a finite field $\mathbb{F}_p$ and p is a large prime number, or in which $\mathbb{k}$ is an extension field of $\mathbb{F}_2$, namely $\mathbb{F}_{2^m}$. In the latter case, the Weierstrass equation is reduced to:

$$y^2+xy=x^3+ax^2+b \quad (2)$$

in which $a, b \in \mathbb{k}$. The binary extension field $\mathbb{F}_{2^m}$ is usually chosen for reasons of implementation convenience (a division by 2 then being implemented by a simple offset). The neutral element of $E_W(\mathbb{F}_p)$ or $E_W(\mathbb{F}_{2^m})$ is a point at infinity $\Omega$.

Cryptography on elliptic curves is used particularly in the Elliptic Curve Digital Signature Algorithm (ECDSA) normalised by NIST (National Institute of Standards and Technology).

More recently, a new family of elliptic curves called Edwards curves was introduced, these curves being defined on a field $\mathbb{F}_p$ in which p is a large prime number:

$$x^2+y^2=1+dx^2y^2 \quad (3)$$

in which $d \in \mathbb{F}_p$. All points P belonging to an Edwards curve can be provided with an affine addition law conferring an additive group structure on it. However, calculations in $\mathbb{F}_p$ are complex to implement and it is difficult to protect them against attacks by auxiliary channels. It should be noted that curves defined by (3) are not elliptic on a characteristic field 2, in other words they are not applicable to a binary extension field $\mathbb{F}_{2^m}$.

To overcome these disadvantages, a family of elliptic curves on a binary extension field $\mathbb{F}_{2^m}$ has been disclosed in the paper by D. J. Bernstein et al. entitled "Binary Edwards Curves", Lecture Notes in Computer Science, vol. 514 LNCS, pp. 244-265, 2008, defined by:

$$d_1(x+y)+d_2(x^2+y^2)=xy+xy(x+y)+x^2y^2 \quad (4)$$

in which $d_1, d_2 \in \mathbb{F}_{2^m}$ with $d_1 \neq 0$ and $d_2 \neq d_1^2 d_1$. These curves are also known under the acronym "BEC".

The affine addition of two points $P_1$ and $P_2$ with coordinates $(x_1, y_1)$ and $(x_2, y_2)$ respectively of a BEC is a point $P_3$, with coordinates $(x_3, y_3)$, defined by:

$$x_3 = \frac{d_1(x_1+x_2)+d_2(x_1+y_1)(x_2+y_2)+(x_1+x_1^2)(x_2(y_1+y_2+1)+y_1y_2)}{d_1+(x_1+x_1^2)(x_2+y_2)} \quad (5\text{-}1)$$

$$y_3 = \frac{d_1(y_1+y_2)+d_2(x_1+y_1)(x_2+y_2)+(y_1+y_1^2)(y_2(x_1+x_2+1)+x_1x_2)}{d_1+(y_1+y_1^2)(x_2+y_2)} \quad (5\text{-}2)$$

Point $P_3$ belongs to the curve in question, since the denominators appearing in (5-1) and (5-2) cannot be zero due to conditions on $d_1$ and $d_2$. The affine addition operation confers an additive group structure, denoted in the following as $E_{BEC}(\mathbb{F}_{2^m})$ on all points in the BEC for which the coordinates belong to $(\mathbb{F}_{2^m})$.

The symmetric nature of equation (4) in x and y will also be noted, with the fact that expressions (5-1) and (5-2) can be deduced from each other due to this symmetry. This has the consequence that if a point P(x, y) belongs to $E_{BEC}(\mathbb{F}_{2^m})$, its symmetric point P'(y, x) also belongs to it. Expressions (4), (5-1) and (5-2) can also be used to demonstrate that P'+P=0, in other words P' is the inverse of P in the additive group $E_{BEC}$ ($\mathbb{F}_{2^m}$) and that the neutral element of this group is simply the neutral point O with coordinates (0,0). It can also be demonstrated that the binary Edwards curve is isomorphous with (or bi-rationally equivalent to) a Weierstrass curve, the neutral point O of the former corresponding to the infinite point $\Omega$ of the latter.

An introduction to binary Edwards curves is given in the thesis by B. Koziel entitled "Low-resource and fast elliptic curve implementations over Binary Edwards Curves", Rochester Institute of Technology, 2016.

A special case of a BEC curve can simplify the multiplication of a point by a scalar. Expressions (5-1) and (5-2) require a large number of operations (particularly calculations of squares, multiplications, and inversions) in the field $\mathbb{F}_{2^m}$. When $d_1=d_2=d$, the BEC curve, then denoted $E_d$ is simplified as follows:

$$d(x+x^2+y+y^2)=xy+xy)+x^2y^2=(x+x^2)(y+y^2) \quad (6)$$

in which d is such that $\nexists t \in \mathbb{F}_{2^m}$ such that $d=t^2+t$. In the following, $E_d$ ($\mathbb{F}_{2^m}$) will be used to denote the additive group $E_{BEC}$ ($\mathbb{F}_{2^m}$) when the BEC is in the form (6). In this case, a differential addition can be carried out, in other words the sum Q+P of two points P, Q of $E_d$ ($\mathbb{F}_{2^m}$) can be calculated from the coordinates of points Q, P and their difference P−Q, as described for example in the article by D. J. Bernstein mentioned above.

Not all BEC curves have the same degree of security against potential attacks, and not all can be implemented in an equivalent manner.

The paper by D. J. Bernstein entitled "Batch binary Edwards" published in Lecture Notes in Computer Science, vol. 5677 LNCS, pp. 317-336, 2009 provides a list of conditions to be satisfied for a cryptographic method on a simplified BEC curve (in other words as defined by expression (6)) to provide a high level of security. In particular, it is recommended that an extension degree m in equal to a prime number should be chosen to guard against so-called GHS (Galbraith, Hess and Smart) attacks and a curve should be chosen such that the order of the group $E_d$ ($\mathbb{F}_{2^m}$) and the order of the additive group on the quadratic twist of the curve; associated with curve $E_d$, are each close to a prime number within a small multiplication factor $E_d^{tw}$. In general, it will be remembered that the quadratic twist of an elliptic curve E on a field $\Bbbk$ is an isomorphic elliptic curve at E on an algebraic closure of $\Bbbk$, in other words an algebraic extension of $\Bbbk$ algebraically closed.

However, the BEC curve on the field $\mathbb{F}_{2^{251}}$ disclosed in the "Batch binary Edwards" paper cannot provide the 128-bit security level recommended by NIST and its calculation speed is not optimised. It will be remembered that the security level of an elliptic curve encryption E($\mathbb{F}_q$) is defined as ½ $\log_2$(|E($\mathbb{F}_q$)|) size of the curve divided by 2).

Consequently, the purpose of the present application is to disclose a cryptographic method on a NEC curve that offers a high security level, a calculation speed faster than is available in the state of the art, and that is suitable for implementation on a 32-bit or 64-bit architecture.

PRESENTATION OF THE INVENTION

This invention is defined by a cryptographic method on a binary Edwards curve defined by d $(x+x^2+y+y^2)=(x+x^2)(y+y^2)$ in the affine plane by a binary extension field $\mathbb{F}_{2^m}[t]= \mathbb{F}_2[X]/(H(X))$ in which $\mathbb{F}_2[X]$ is the polynomial ring with coefficients in $\mathbb{F}_2$ and H (X) is an irreducible polynomial of $\mathbb{F}_2[X]$ with degree m, the parameter d of the curve being an element of $\mathbb{F}_{2^m}[t]$, the set of points on the curve being provided with a law such that it has an additive group structure, $E_d$ ($\mathbb{F}_{2^m}$), said method making use of at least one cryptographic primitive in which an integer k is transformed into kG in which G is a point in $E_d$ ($\mathbb{F}_{2^m}$) called the generating point, in which:

for an implementation of said method using a 32-bit or 64-bit hardware architecture, the binary extension field is one of the following fields:

$\mathbb{F}_{2^{257}}[t]=\mathbb{F}_2[X]/(X^{257}+X^{65}+1)$;
$\mathbb{F}_{2^{431}}[t]=\mathbb{F}_2[X]/(X^{431}+X^{303}+X^{239}+X^{111}+1)$;
$\mathbb{F}_{2^{487}}[t]=\mathbb{F}_2[X]/(X^{487}+X^{295}+X^{167}+X^{39}+1)$;
$\mathbb{F}_{2^{569}}[t]=\mathbb{F}_2[X]/(X^{569}+X^{441}+X^{313}+X^{121}+1)$; and for an implementation using a 32-bit hardware architecture, the binary extension field can also be chosen from among:

$\mathbb{F}_{2^{223}}[t]=\mathbb{F}_2[X]/(X^{223}+X^{159}+1)$;
$\mathbb{F}_{2^{479}}[t]=\mathbb{F}_2[X]/(X^{479}+X^{255}+1)$
$\mathbb{F}_{2^{521}}[t]=\mathbb{F}_2[X]/(X^{521}+X^{489}+1)$;

the parameter d of the binary Edwards curve on each of these binary extension fields being given in the Appendix.

Advantageously, the parameter d of the binary Edwards curve is given by:

for $\mathbb{F}_{2^{223}}[t]$: $d=t^{64}+t^{36}+t^5+1$;
for $\mathbb{F}_{2^{257}}[t]$: $d=t^{65}+t^{31}+t^{14}+1$;
for $\mathbb{F}_{2^{313}}[t]$: $d=t^{38}+t^{33}+t^{28}+1$;
for $\mathbb{F}_{2^{431}}[t]$: $d=t^{83}+t^{66}+t^{17}+1$;
for $\mathbb{F}_{2^{479}}[t]$: $d=t^{73}+t^{29}+t^3+1$;
for $\mathbb{F}_{2^{487}}[t]$: $d=t^{69}+t^{33}+t^{15}+1$;
for $\mathbb{F}_{2^{521}}[t]$: $d=t^{66}+t^{29}+t^{28}+1$;
for $\mathbb{F}_{2^{569}}[t]$: $d=t^{56}+t^{45}+t^{41}+1$.

Said generating point G, with affine coordinates ($G_x$, $G_y$), is advantageously chosen such that its differential coordinate $w(G)=G_x+G_y$ satisfies:

$$\text{for } \mathbb{F}_{2^{223}}[t]: \frac{1}{w(G)} = t^{32}+1;$$

$$\text{for } \mathbb{F}_{2^{257}}[t]: \frac{1}{w(G)} = t^{192};$$

$$\text{for } \mathbb{F}_{2^{313}}[t]: \frac{1}{w(G)} = t^{64}+1;$$

$$\text{for } \mathbb{F}_{2^{431}}[t]: \frac{1}{w(G)} = t^{64}+1;$$

$$\text{for } \mathbb{F}_{2^{479}}[t]: \frac{1}{w(G)} = t^{64}+1;$$

$$\text{for } \mathbb{F}_{2^{487}}[t]: \frac{1}{w(G)} = t^{64}+1;$$

$$\text{for } \mathbb{F}_{2^{521}}[t]: \frac{1}{w(G)} = t^{32}+1;$$

$$\text{for } \mathbb{F}_{2^{569}}[t]: \frac{1}{w(G)} = t^{64}+1.$$

Preferably, the affine coordinates ($G_x$, $G_y$) of the generating point are given in hexadecimal notation by:

for $\mathbb{F}_{2^{223}}[t]$:
$G_x$=205bfedd 71b0b0fd feb3345a f71cc721 790e83c4 b88094e9 a63f6d43
$G_y$=205bfedd f1b0b0fd 7eb3345a f71cc721 790e83c4 b8809 4e9 a63f6d43 for $\mathbb{F}_{2^{223}}[t]$:
$G_x$=1 6b46e24a a4b12ab2 289fcd34 17615387 810f083f 43419d8c ae38ad9a c640d960

G_y=1 6b46e24a a4b12aba 289fcd34 17615383 810f083f 43419d8e ae38ad9a c640d968 for $\mathbb{F}_{2^{313}}$ [t]:

G_x=15c67e3 024c7c27 466e72a3 391256e9 a729fc15 8092053d 89087c0f 38408b21 4b0ade57 363ea938

G_y=15c67e3 024c7c27 446e72a3 391256e9 a529fc15 8092053d 8b087c0f 38408b21 4b0ade57 363ea938 for $\mathbb{F}_{2^{431}}$ [t]:

G_x=4e17 65c1f2f6 140db17d 5ef2f14c 59a38a93 e5b65ba9 acca547b f2cc34f3 d55bd85c cf4daeaf 7ca1beca a8ee877b 01f8d8ac ae12b210

G_y=4e17 65c1f2f6 140d317d 5ef2f14c 59a30a93 e5b65ba9 acca547b f2cc34f3 d55585c cf4daeaf 7ca13eca a8ee877b 01f8d8ac ae12b210 for $\mathbb{F}_{2^{479}}$ [t]:

G_x=7bdd9f19 e11e888e 80d7c093 092d208b 4fe996e8 fcbdffa2 8cc90173 ece2c436 73f1372e 975ba9dc d3a06332 abf15dbe 9b679f6c 63e30b88 4ab93272

G_y=3bdd9f19 a11e888e 40d 7c093 492d208b 8fe996e8 bcbdffa2 4cc90173 ece2c436 f3f1372e 175ba9dc 53a06332 2bf15dbe 1b679f6c e3e30b88 cab93272 for $\mathbb{F}_{2^{487}}$ [t]:

G_x=33 9b843c53 c409543f 396d39e5 7efde813 f06e3099 735004b9 99b15776 a75a4c3a 22dcaf1e 91e261fe 479b89a6 4d651039 28195d72 7bd3d157 735b2071

G_y=33 9b843c53 c40954bf 396d39e5 7efde893 f06e3099 73500439 99b15776 a75a4c3a 22dcaf1e 91e261fe 479b89a6 4d6510b9 28195d72 7bd3d1d7 735b2071 for $\mathbb{F}_{2^{521}}$ [t]:

G_x=16b 369b497b 805e6199 a342909a a4608cdc ecb10e09 88ba73eb 1f118603 9c8b1f6d 2a9db39b 1302d29d 9d449b9a a459cc5d 6bbb4e33 a1eb8fcc 056ce724 cde5aaa8

G_y=16b 369b4b7b 805e6199 a342909a a4608cdc ecb10e09 88ba73eb 1f118603 9c8b1f6d 2a9db39b 1302d29d 9d449b9a a459cc5d 6bbb4e33 a1eb8fcc 056ce724 cde5aaa8 for $\mathbb{F}_{2^{569}}$ [t]:

G_x=195b22b 2864ee08 dd456bab 1a95cdd8 c7e3fd33 0fddf630 f9c3bb5c 33f062b3 41c919c6 bb4cbf1d 4335a344 ed023b31 9585ea0e 16f03453 cc5ba9a8 6a4b28b1 6e1c72ad 75f1411f G_y=195b22b 2864ee08 df456bab 1a95cdd8 c5e3d33 0fddf630 f9c3bb5c 33f062b3 41c919c6 bb4cbf1d 4135a344 ed023b31 9785ea0e 16f03453 ce5ba9a8 6a4b28b1 6e1c72ad 75f1141f

BRIEF DESCRIPTION OF THE DRAWINGS

Other characteristics and advantages of the invention will become clear after reading a preferred embodiment of the invention, given with reference to the single FIGURE diagrammatically illustrating a method for selecting parameters of a cryptographic method on a binary Edwards curve according to one embodiment of the invention.

DETAILED PRESENTATION OF PARTICULAR EMBODIMENTS

In the following description we will consider a cryptographic method on an elliptic curve, the elliptic curve being a simplified binary Edwards curve, $E_d$, in other words for which the points satisfy the relation (6). All points on the curve for which the coordinates belong to $\mathbb{F}_{2^m}$, and with the affine addition relation defined by (5-1) and (5-2), with $d_1=d_2=d$, have an additive group structure, $E_d(\mathbb{F}_{2^m})$.

A cryptographic method on elliptic curve refers particularly to an encryption method, a decryption method, a method generating a pair (private key, public key, etc.) a method of exchanging keys using a Diffie-Hellmann protocol, an electronic signature method, etc., making use of at least one cryptographic primitive in which an integer k is transformed into a point kP in which P is a point on said elliptic curve. In other words, said cryptographic method makes use of at least one exponentiation operation in the group $E_d(\mathbb{F}_{2^m})$.

The basic concept of the invention is to select the parameters for the cryptographic method on a BEC curve as a function of a number of security criteria, ease of implementation, and calculation speed.

In a first step, a search is made for binary extension fields $\mathbb{F}_{2^m}$ and the associated irreducible polynomials that are useful for arithmetic calculations using a 32-bit or 64-bit hardware architecture. A 32-bit or 64-bit hardware architecture means that the register and/or databus size is 32 or 64 bits. For example, such a hardware architecture will be present in a 32-bit or 64-bit cryptoprocessor.

For each prime number a included in an interval [$a_{min}$, $a_{max}$] in which $a_{min}$ is a predetermined minimum value corresponding to the minimum required security level and $a_{max}$ is a predetermined maximum value, the irreducible polynomials are looked for in $\mathbb{F}_2[X]$ with degree a and in trinomial form:

$$H(X)=X^a+X^b+1 \quad (7\text{-}1)$$

in which the degrees of the monomials satisfy the relation:

$$a-b=0[\text{wordsize}] \quad (7\text{-}2)$$

in which wordsize is the size as a number of bits of the registers in the hardware architecture of the required implementation. For example wordsize=32 or 64 depending on whether an implementation on 32 bits or 64 bits is required.

Advantageously, $a_{min}=256$ will be chosen to be able to reach the minimum security level of 128 bits recommended by the NIST. However, it will be possible to waive this principle when the resources of the IoT node are small and a lower security level can be accepted. In the latter case, $a_{min}=160$ can be chosen if a minimum security level of 80 bits is accepted.

It will be noted that if condition (7-2) is satisfied on 64 bits, it is even more acceptable on 32 bits. If such a trinomial does not exist for a given value of a, in other words if there is no integer b satisfying a−b=0[wordsize] such that H(X) is an irreducible polynomial of $\mathbb{F}_{2^m}$, a search will be made for pentanomial polynomials:

$$H(X)=X^a+X^b+X^c+X^d+1 \quad (8\text{-}1)$$

such that:

$$a-b=0[\text{wordsize}], a-c=0[\text{wordsize}] \text{ et } a-d=0[\text{wordsize}] \quad (8\text{-}2)$$

It can be shown that for every degree of binary extension in, a trinomial or pentanomial form of polynomial can be found with degree a=m, irreducible on $\mathbb{F}_2$ and primitive on $\mathbb{F}_{2^m}$, in other words the quotient ring $\mathbb{F}_2[X]/(H(X))$ is isomorphic at the binary extension $\mathbb{F}_{2^m}$ in which $\mathbb{F}_2[X]$ is the polynomial ring with coefficients in $\mathbb{F}_2$. H(X) being irreducible on $\mathbb{F}_2$, $\mathbb{F}_2[X]/(H(X))$ has a field structure like $\mathbb{F}_{2^m}$. t will denote the class of X in $\mathbb{F}_2[X]/(H(X))$, therefore t is a root of H(X). $\mathbb{F}_{2^m}$ being identical to $\mathbb{F}_{2^m}[t]=\mathbb{F}_2[X]/(H(X))$ except for an isomorphism, the two notations being considered to be equivalent and being used indifferently in the following.

At the end of this first step, the result obtained is thus a list of candidate fields $\mathbb{F}_{2^m}$ in which m is prime, each candidate field $\mathbb{F}_{2^m}$ being associated with an irreducible polynomial H(X) with degree m with coefficients in $\mathbb{F}_2$, in trinomial or pentanomial form, satisfying conditions (7-2) or (8-2) respectively.

Thus, for the [160,571] interval, in particular the following candidate fields can be retained:

$$\mathbb{F}_{2^{223}}[t] = \mathbb{F}_2[X]/(X^{223}+X^{159}+1) \tag{9-1}$$

$$\mathbb{F}_{2^{257}}[t] = \mathbb{F}_2[X]/(X^{257}+X^{65}+1) \tag{9-2}$$

$$\mathbb{F}_{2^{313}}[t] = \mathbb{F}_2[X]/(X^{313}+X^{121}+1) \tag{9-3}$$

$$\mathbb{F}_{2^{431}}[t] = \mathbb{F}_2[X]/(X^{431}+X^{303}+X^{239}+X^{111}+1) \tag{9-4}$$

$$\mathbb{F}_{2^{479}}[t] = \mathbb{F}_2[X]/(X^{479}+X^{255}+1) \tag{9-5}$$

$$\mathbb{F}_{2^{487}}[t] = \mathbb{F}_2[X]/(X^{487}+X^{295}+X^{167}+X^{39}+1) \tag{9-6}$$

$$\mathbb{F}_{2^{521}}[t] = \mathbb{F}_2[X]/(X^{521}+X^{489}+1) \tag{9-7}$$

$$\mathbb{F}_{2^{569}}[t] = \mathbb{F}_2[X]/(X^{569}+X^{441}+X^{313}+X^{121}+1) \tag{9-8}$$

All the above fields are suitable for arithmetic calculations (particularly reductions) using a 64-bit or a 32-bit architecture, except for fields $\mathbb{F}_{2^{479}}[t]$ and $\mathbb{F}_{2^{521}}[t]$ that are only suitable for a 32-bit architecture.

In a second step, for each of the above fields $\mathbb{F}_{2^m}[t]$, a search is made for a simplified BEC curve (see expression (6)), in other words an element d of $\mathbb{F}_{2^m}$, such that the order of the group $E_d(\mathbb{F}_{2^m})$, denoted $|E_d(\mathbb{F}_{2^m})|$, is of the form $2^s n$ in which n is a prime number and $s \in \{1,2,3\}$, and such that $|E_d^{tw}(\mathbb{F}_{2^m})|$, the order of the group associated with the quadratically twisted BEC curve, $E_d^{tw}$, is already in form $2^{s'} n'$ in which n' is a prime number and $s' \in \{1,2,3\}$). This constraint on $|E_d(\mathbb{F}_{2^m})|$ (and on $|E_d^{tw}(\mathbb{F}_{2^m})|$, in other words on the number of points on curve $E_d$ (and $E_d^{tw}$ respectively), for which it should be remembered that the coordinates are elements of the field $\mathbb{F}_{2^m}$, can reduce the sensitivity to usual attacks on the resolution of ECDLP on the BEC curve (and attacks by defect performed on the quadratic twist respectively).

In practice, a search is made for an element d with a low Hamming weight beginning with a binomial expression in t (Hamming weight equal to 2), then a trinomial expression (Hamming weight equal to 3), a quadrinomial expression (Hamming weight equal to 4) and finally a pentanomial expression (Hamming weight equal to 5), in other words in the latter case:

$$d = t^\alpha + t^\beta + t^\delta + t^\gamma + 1 \tag{10}$$

in which $m > \alpha > \beta > \delta > \gamma > 0$ are integers, d being such that $|E_d(\mathbb{F})| = 2^s n$ and $|E_d^{tw}(\mathbb{F}_{2^m})| = 2^{s'} n'$ with the above-mentioned conventions.

Other security criteria, less important than the criterion mentioned above, can also be taken into account, such as:
- the j-invariant of the BEC curve, namely $1/d^8$ must be a generating element of $\mathbb{F}_{2^m}[t]$;
- the discriminant of the complex multiplication of the BEC curve, namely $\Delta_{E_d} = \mathrm{Tr}(E_d)^2 - 4p^m$, must be divisible by a large prime number (for example more than $2^{100}$) exactly once;
- the multiplication order of $2^m$, modulo n, in $\mathbb{F}_{2^m}[t]$ is high (for example more than $$\frac{m-1}{100}).$$

Similarly, the multiplication order of $2^m$, modulo n', in $\mathbb{F}_{2^m}[t]$ is high (for example more than $$\frac{m-1}{100}).$$

In some cases, these security criteria can prevent an acceleration of ECDLP attacks.

It should be noted that relatively few values of d satisfy all these conditions.

The Appendix gives the lowest values of the parameter d and the order of groups $E_d(\mathbb{F}_{2^m})$ and $E_d^{tw}(\mathbb{F}_{2^m})$, for each candidate field. To simplify the notations, in the Appendix the notations $|E|$ and $|E^{tw}|$ have been adopted instead of $|E_d(\mathbb{F}_{2^m})|$ and $|E_d^{tw}(\mathbb{F}_{2^m})|$, respectively.

In a third step, a search is made for each BEC curve selected in the second step, to find an optimum generating point G to perform arithmetic operations on the BEC curve and more precisely in the additive group $E_d(\mathbb{F}_{2^m})$.

Considering that the order of G (in other words the order of the cyclic sub-group generated by G) divides the order $|E_d(\mathbb{F}_{2^m})| = 2^s n$, advantageously, a point G with order n will be chosen, the cofactor of G then being $2^s$. The fact that a first order generating point (high) is chosen significantly increases the security of the calculations against attacks.

One important advantage of the invention is that the generating point is also chosen to simplify calculations on the BEC curve.

It is recalled that arithmetic operations (particularly addition and doubling) on points on the curve generally use a differential addition technique (see the above-mentioned paper "Binary Edwards Curves" by Bernstein et al). According to this technique, each point on the curve P(x,y) is represented by a coordinate w(P)=x+y that is an element of $F_{2^m}[t]$. It is then possible to calculate w(2P) and w(Q+P) (in which Q is another point on the BEC curve) starting from w(P), w(Q) and w(Q−P). More precisely, if it is assumed that $$w(P) = \frac{W_2}{Z_2}, w(Q) = \frac{W_3}{Z_3},$$

$w(Q-P)=w_1$ by adopting a mixed representation (affine and projective), we obtain:

$$w(2P) = \frac{C^2}{d(Z_2^2)^2 + C^2} \tag{11-1}$$

$$w(P+Q) = \frac{V + Z_5 w_1}{V + d(Z_2 Z_3)^2} \tag{11-2}$$

in which $C = W_2(Z_2+W_2)$ and $V = CW_3(Z_3+W_3)$.

This operation can be further simplified (saving a squaring operation of the denominator of (11-1) and (11-2)) by adopting a common denominator for w(P) and w(Q), as described in B. Koziel's thesis mentioned above (section 3.2.5.1). This simplification is known in the literature under the name "Co-Z trick".

In this case, w(P) and w(Q) are represented in the form $$w(P) = \frac{W_2}{Z} \text{ and } w(Q) = \frac{W_3}{Z},$$

and the expressions (11-1), (11-2) become:

$$w(2P) = \frac{(W_2(W_2 + Z))^2}{dZ^4 + (W_2(W_2 + Z))^2} \quad (12\text{-}1)$$

$$w(P+Q) = \frac{(W_2 + W_3)^2 + \frac{1}{w_1}(W_2 + W_3)^2}{Z^2 + \frac{1}{w_1}(W_2 + W_3)^2} \quad (12\text{-}2)$$

It is then possible to obtain the coordinates (x, y) from the differential coordinates w, as described for example in B. Koziel's thesis mentioned above (algorithm 3.3).

It will be noted that expression (12-2) uses $$\frac{1}{w_1}$$

in which $w_1 = w(Q-P)$. When it is required to use successive iterations on a Montgomery scale to calculate $w(P+Q)$, the difference between two points within an iteration is equal to $Q-P=G$. The result is that all iterations use the element $$\frac{1}{w(G)}$$

of $\mathbb{F}_{2^m}[t]$.

In order to reduce the number of multiplications in $\mathbb{F}_{2^m}[t]$, it is useful to choose a generating point such that the Hamming weight of $$\frac{1}{w(G)}$$

is low. In other words, ideally $$\frac{1}{w(G)}$$

must be a monomial or a binomial in t:

$$\frac{1}{w(G)} = t^\lambda \quad (13\text{-}1)$$

or $$\frac{1}{w(G)} = t^\lambda + 1 \quad (13\text{-}2)$$

in which $1 < \lambda < m$.

Furthermore, in order to simplify the hardware implementation of the calculation, in preference $\lambda$ will be chosen to be a multiple of the word size wordsize (32 or 64).

For each candidate field selected after the first step, the values among the possible values of d supplied in the second step that will give a generating point G with affine coordinates $G_x$, $G_y$ satisfying (13-1) or (13-2), will be chosen.

It can be demonstrated that the selected triplets $\mathbb{F}_{2^m}[t]$, d and $$\frac{1}{w(G)}$$

are definitively:

$$\mathbb{F}_{2^{223}}[t]: d = t^{64} + t^{36} + t^5 + 1 \text{ and } \frac{1}{w(G)} = t^{32} + 1 \quad (14\text{-}1)$$

$$\mathbb{F}_{2^{257}}[t]: d = t^{65} + t^{31} + t^{14} + 1 \text{ and } \frac{1}{w(G)} = t^{192} \quad (14\text{-}2)$$

$$\mathbb{F}_{2^{313}}[t]: d = t^{38} + t^{33} + t^{28} + 1 \text{ and } \frac{1}{w(G)} = t^{64} + 1 \quad (14\text{-}3)$$

$$\mathbb{F}_{2^{431}}[t]: d = t^{83} + t^{66} + t^{17} + 1 \text{ and } \frac{1}{w(G)} = t^{64} + 1 \quad (14\text{-}4)$$

$$\mathbb{F}_{2^{479}}[t]: d = t^{73} + t^{29} + t^3 + 1 \text{ and } \frac{1}{w(G)} = t^{64} + 1 \quad (14\text{-}5)$$

$$\mathbb{F}_{2^{487}}[t]: d = t^{69} + t^{33} + t^{15} + 1 \text{ and } \frac{1}{w(G)} = t^{64} + 1 \quad (14\text{-}6)$$

$$\mathbb{F}_{2^{521}}[t]: d = t^{66} + t^{29} + t^{28} + 1 \text{ and } \frac{1}{w(G)} = t^{32} + 1 \quad (14\text{-}7)$$

$$\mathbb{F}_{2^{569}}[t]: d = t^{56} + t^{45} + t^{41} + 1 \text{ and } \frac{1}{w(G)} = t^{64} + 1 \quad (14\text{-}8)$$

Due to the shape of $$\frac{1}{w(G)},$$

it can be understood that the triplets given above are compatible with an implementation on a 32-bit or 64-bit hardware architecture, however with the exception of $\mathbb{F}_{2^{223}}[t]$ and $\mathbb{F}_{2^{521}}[t]$ (see also comment given above under (9-7) for $\mathbb{F}_{2^{479}}[t]$), compatible only with an implementation on a 32-bit hardware architecture.

For each of the curves defined on the above fields, the generating points G are given respectively by their affine coordinates (in hexadecimal notation):

for $\mathbb{F}_{2^{223}}[t]$ and $d=t^{64}+t^{36}+t^5+1$:
$G_x$=205bfedd 71b0b0fd feb3345a f71cc721 790e83c4 1)88094e9 a63f6d43
$G_y$=205bfedd f1b0b0fd 7eb3345a f71cc721 790e83c4 b88094e9 a63f6d43 for $\mathbb{F}_{2^{257}}[t]$ and $d=t^{65}+t^{31}+t^{14}+1$:
$G_x$=1 6b46e24a a4b12ab2 289fcd34 17615387 810f083f 43419d8c ae38ad9a c640d960
$G_y$=1 6b46e24a a4b12aba 289fcd34 17615383 810f083f 43419d8e ae38ad9a c640d968 for $\mathbb{F}_{2^{313}}[t]$ and $d=t^{38}+t^{33}+t^{28}+1$:
$G_x$=15c67e3 024c7c27 466e72a3 391256e9 a729fc15 8092053d 89087c0f 38408b21 4b0ade57 363ea938
$G_y$=15c67e3 024c7c27 446e72a3 391256e9 a529fc15 8092053d 8b087c0f 38408b21 4b0ade57 363ea938 for $\mathbb{F}_{2^{431}}[t]$ and $d=t^{83}+t^{66}+t^{17}+1$:
$G_x$=4e17 65c1f2f6 140db17d 5ef2f14c 59a38a93 e5b65ba9 acca547b f2cc34f3 d55bd85c cf4daeaf 7ca1beca a8ee877b 01f8d8ac ae12b210

$G_y$=4e17 65c1f2f6 140d317d 5ef2f1459a30a93 e5b65ba9 acca547b f2cc34f3 d55b585c cf4daef 7ca13eca a8ee877b 01f8d8ac ae12b210 for $\mathbb{F}_{2^{479}}$ [t] and d=$t^{73}$+$t^{29}$+$t^3$+1:

$G_x$=7bdd9f19 e11e888e 80d7c093 092d208b 4fe996e8 fcbdffa2 8cc90173 ece2c436 73f1372e 975ba9dc d3a06332 abf15dbe 9b679f6c 63e30b88 4ab93272

$G_y$=3bdd9f19 a11e888e 40d7c093 492d208b 8fe996e8 bcbdffa2 4cc90173 ece2c436 f3f1372e 175ba9dc 53a06332 2bf15dbe 1b679f6c e3e30b88 cab93272 for $\mathbb{F}_{2^{487}}$ [t] and d=$t^{69}$+$t^{33}$+$t^{15}$+1:

$G_x$=33 9b843c53 c409543f 396d39e5 7efde813 f06e3099 735004b9 99b15776 a75a4c3a 22dcaf1e 91e261fe 479b89a6 4d651039 28195d72 7bd3d157 735b2071

$G_y$=33 9b843c53 c40954bf 396d39e5 7efde893 f06e3099 73500439 99b15776 a75a4c3a 22dcaf1e 91e261fe 479b89a6 4d6510b9 28195d72 7bd3d1d7 735b2071 for $\mathbb{F}_{2^{521}}$ [t] and d=$t^{66}$+$t^{29}$+$t^{28}$+1:

$G_x$=16b 369b479b 805e6199 a342909a a4608cdc eeb10e09 88ba73eb 1f118603 9c8b1f6d 2a9db39b 1302d29d 9d449b9a a459cc5d 6bbb4e33 a1eb8fcc 056ce724 cde5aaa8

Figure 1:
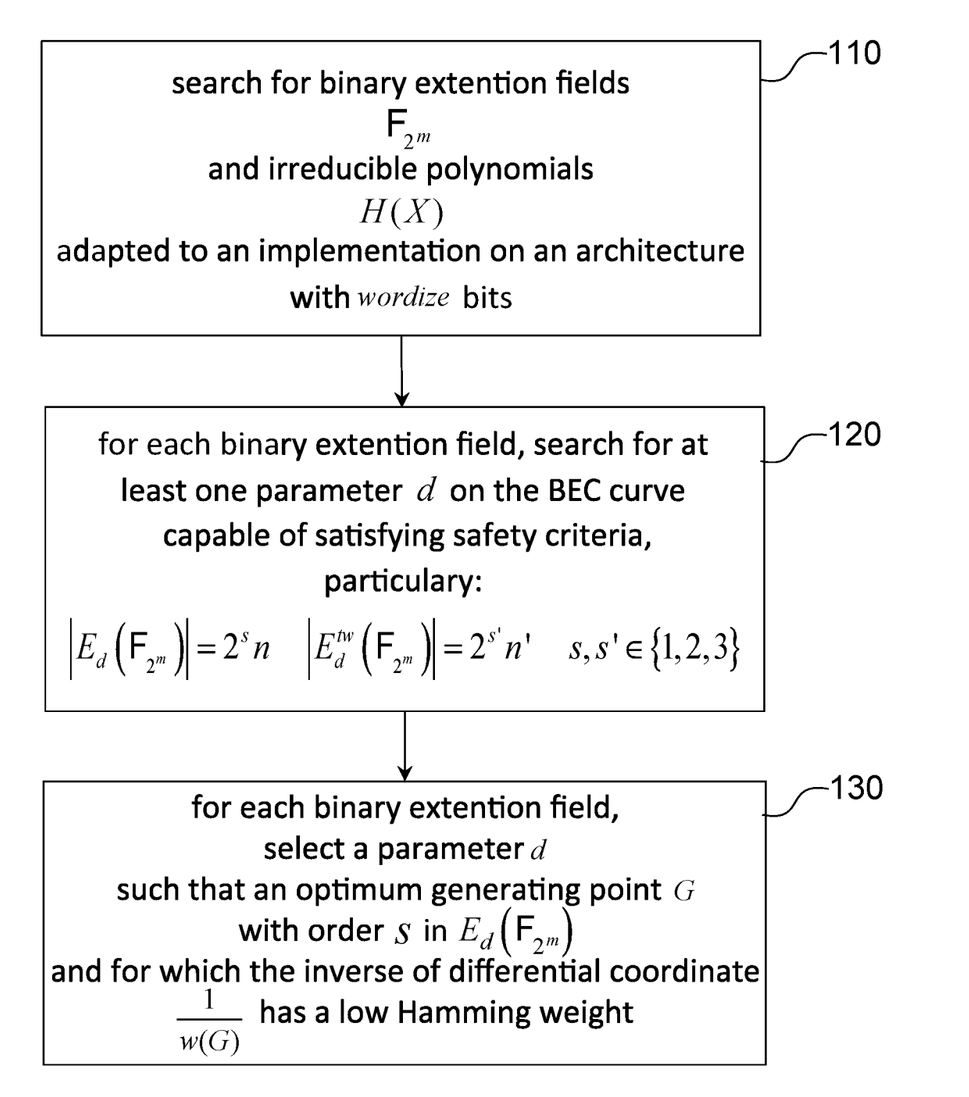

$G_y$=16b369b4b7b 805e6199 a342909a a4608cdc ecb10e09 88ba73eb 1f118603 9c8b1f6d 2a9db39b 1302d29d 9d449b9a a459cc5d 6bbb4e33 a1eb8fcc 056ce724 cde5aaa8 for $\mathbb{F}_{2^{569}}$ [t] and d=$t^{56}$+$t^{45}$+$t^{41}$+1:

$G_x$=195b22b 2864ee08 dd456bab 1a95cdd8 c7e3fd33 0fddf630 f9c3bb5c 33f062b3 41c919c6 bb4cbf1d 4335a344 ed023b31 9585ea0e 16f03453 cc5ba9a8 6a4b28b1 6e1c72ad 75f1141f $G_y$=195b22b 2864ee08 df456bab 1a95cdd8 c5c3fd33 0fddf630 f9c3bb5c 33f062b3 41c919c6 bb4cbf1d 4135a344 ed023b31 9785ea0e 16f03453 ce5ba9a8 6a4b28b1 6e1c72ad 75f1141f The single FIGURE diagrammatically summarises steps in the selection of parameters for a cryptographic method on a binary Edwards curve according to one embodiment of the invention.

In step 110, a search is made on binary extension fields $\mathbb{F}_{2^m}$, in which m lies within a predetermined interval of prime numbers and associated primitive polynomials (in other words irreducible polynomials with degree m on $\mathbb{F}_2[X]$), such that the arithmetic calculations on these fields are suitable for an implementation on a hardware architecture using predetermined a word size wordsize (32 or 64 bits).

A list of binary extension fields $\mathbb{F}_{2^m}$ is obtained, together with a primitive polynomial H(X) for each of these fields.

In step 120, for each field output from step 110, a search is made for BEC curves defined by their parameters $d \in \mathbb{F}_{2^m}$ [t] (with the lowest possible values) satisfying a plurality of security criteria and firstly, $|E_d(\mathbb{F}_{2^m})|=2^s$ n and $|E_d^{tw}(\mathbb{F}_{2^m})|=2^{s'}$ n' in which s,s'$\in\{1,2,3\}$). The list of parameters d for each field is given in the Appendix.

In step 130, for each field output from step 110, values among d output from the second step are chosen so as to obtain an optimum generating point G to perform arithmetic operations on $E_d(\mathbb{F}_{2^m})$. If there is such an optimum point, its order will be s in $E_d(\mathbb{F}_{2^m})$ and the inverse of its differential coordinate $$\frac{1}{w(G)}$$

in $\mathbb{F}_{2^m}$ [t] has a low Hamming weight (1 or 2). This step provides a selection of values of the parameter d and generating points G for each of the fields supplied in step 110.

A cryptographic method on a BEC curve, for which domain parameters are derived from this selection, is particularly efficient in terms of the number of calculations, is simple to implement on a 32-bit or 64-bit hardware architecture and is resistant to known attacks.

For example, an encryption/decryption method on a BEC curve using domain parameters derived from this selection is described below.

It is assumed that Bob wants to send a message M to Alice in which $M \in E_d(\mathbb{F}_{2^m})$. Bob has a secret key k (integer value) and a corresponding public key A=kG, in which G is the generating point appearing in the domain parameters. Similarly, Alice has a private key y and a corresponding public key Y=yG.

Bob then calculates H=kY and $M_{enc}$=M+H then transmits (H, $M_{enc}$) to Alice. Alice then performs the operation H'=yA and obtains the message M in plain text making use of $M_{enc}$−H'=M+kyG−ykG=M.

APPENDIX $\mathbb{F}_{2^{223}}$:

$d = t^{155} + t^{111} + 1$
$|E| = 13479973333575319897333350754350981974915869380776165028497683523796$ $d = t^{44} + t^{35} + t^{26} + 1$
$|E^{tw}| = 13479973333575319897333350754350981092447845057176440745260592672542$ $d = t^{44} + t^{35} + t^{26} + 1$
$|E| = 13479973333575319897333350754350981653027898960696123888374321955643092$ $d = t^{53} + t^{23} + t^7 + 1$
$|E^{tw}| = 13479973333575319897333350754350981414335845481557933410678165460612$ $d = t^{53} + t^{23} + t^7 + 1$
$|E| = 13479973333575319897333350754350981012156787046715773259092397733320$ $d = t^{54} + t^{42} + t^5 + 1$
$|E^{tw}| = 13479973333575319897333350754350982055206927395538239890179632916014$ $d = t^{54} + t^{42} + t^5 + 1$
$|E| = 13479973333575319897333350754350981879686013129322391496219288056405$ $d = t^{55} + t^{40} + t^{26} + 1$
$|E^{tw}| = 13479973333575319897333350754350981187677701312931665751891072968516$ $d = t^{55} + t^{40} + t^{26} + 1$
$|E| = 13479973333575319897333350754350981793887598864489545475623750881800$ $d = t^{57} + t^{44} + t^2 + 1$
$|E^{tw}| = 13479973333575319897333350754350981273476115577764511772486610143121$ $d = t^{57} + t^{44} + t^2 + 1$
$|E| = 13479973333575319897333350754350980936055212516676923172040374879035$ $d = t^{58} + t^{48} + t^{13} + 1$
$|E^{tw}| = 13479973333575319897333350754350982131308501925557713407606998614588$ $d = t^{58} + t^{48} + t^{13} + 1$
$|E| = 13479973333575319897333350754350981500963337399910176999880257426280$ $d = t^{64} + t^{36} + t^5 + 1$
$|E^{tw}| = 13479973333575319897333350754350981566400377042343880248230103598641$ $d = t^{64} + t^{36} + t^5 + 1$
$|E| = 13479973333575319897333350754350981789887736628631840626232429754476$ $d = t^{64} + t^{55} + t^{46} + 1$
$|E^{tw}| = 13479973333575319897333350754350981277475978075967738841848036727374$ $d = t^{64} + t^{55} + t^{46} + 1$
$|E| = 13479973333575319897333350754350982022723945420554483790586265210824$ $|E^{tw}| = 13479973333575319897333350754350981044639769021699573457524095814097$

-continued $d = t^{65} + t^{37} + t^{35} + 1$ $|E| = 1347997333357531989733350754350981479450291587349555853466954242443444$ $d = t^{65} + t^{61} + t^{52} + 1$ $|E| = 1347997333357531989733350754350981587913422854904501394643406780574$ $d = t^{65} + t^{61} + t^{52} + 1$ $|E^{tw}| = 1347997333357531989733350754350981784482333780999608599033022969225236$ $d = t^{66} + t^{44} + t^{19} + 1$ $|E| = 1347997333357531989733350754350981282881380661257797912577780131332982$ $d = t^{66} + t^{44} + t^{19} + 1$ $|E^{tw}| = 1347997333357531989733350754350981794036700543404979932766278790568$ $|E| = 1347997333357531989733350754350981273057013898849077315344082234353$ $\mathbb{F}_{2^{257}}:$ $d = t^{41} + t^{29} + t^{10} + 1$ $|E| = 2315841784746323908471419700173758157067737370140165262889483902151088501148$ $d = t^{41} + t^{29} + t^{10} + 1$ $|E^{tw}| = 2315841784746323908471419700173758157063020164516062089494085212950143005898$ $d = t^{56} + t^{46} + t^{45} + 1$ $|E| = 2315841784746323908471419700173758157062852610420168714334878692043975974752$ $d = t^{56} + t^{46} + t^{45} + 1$ $|E^{tw}| = 2315841784746323908471419700173758157067946776205453847243424668272549210802948$ $d = t^{65} + t^{31} + t^{14} + 1$ $|E| = 2315841784746323908471419700173758157063326169673627090211406329232917976189089$ $d = t^{65} + t^{31} + t^{14} + 1$ $|E^{tw}| = 2315841784746323908471419700173758157067473216951995471366897031083607209408383$ $d = t^{66} + t^{47} + t^{29} + 1$ $|E| = 2315841784746323908471419700173758157058887860786971444610695565970322546457$ $d = t^{66} + t^{47} + t^{29} + 1$ $|E^{tw}| = 2315841784746323908471419700173758157071911525838645847117233803719492930951748$ $\mathbb{F}_{2^{313}}:$ $d = t^{38} + t^{33} + t^{28} + 1$ $|E| = 16687398718132110018711107079449625895333629080816145622654492179886000188895406224309766337212$ $d = t^{53} + t^{49} + t^{17} + 1$ $|E^{tw}| = 16687398718132110018711107079449625895333629080100655539077679590423358319642710236979901627111744$ $d = t^{53} + t^{49} + t^{17} + 1$ $|E| = 16687398718132110018711107079449625895333629080926737366557300739207831039893453396724372848188$ $|E^{tw}| = 16687398718132110018711107079449625895333629080895965763865224383014352175429055197384409760198$ -continued $d = t^{60} + t^{33} + t^{20} + 1$ $|E| = 16687398718132110018711107079449625895333362908090031381260874024496037587950302930203596657954$ $|E^{tw}| = 16687398718132110018711107079449625895333362908090092238571781378484877261807335819479292072816028838$ $d = t^{76} + t^{66} + t^{56} + 1$ $|E| = 16687398718132110018711107079449625895333362908081614562265454921798860001889540622430976633721$ $|E^{tw}| = 16687398718132110018711107079449625895333362908100655390776797590423358196427102369799016271174$ $d = t^{87} + t^{58} + t^{42} + 1$ $|E| = 16687398718132110018711107079449625895333362908086942300872767728993590648032762872892280740188$ $|E^{tw}| = 16687398718132110018711107079449625895333362908095675722954974834932859256728974572121650186819$ $d = t^{151} + t^{117} + t^{34} + 1$ $|E| = 16687398718132110018711107079449625895333362908096988141264558695887280957483615074141367436302$ $|E^{tw}| = 16687398718132110018711107079449625895333362908085288540396665553349408746696100117997203897811$ $d = t^{196} + t^{137} + t^{59} + 1$ $|E| = 16687398718132110018711107079449625895333362908093529736127723617359396090308494612073645932$ $|E^{tw}| = 16687398718132110018711107079449625895333362908088736979429480150486278712501401443290141801514$ $d = t^{208} + t^{199} + t^{69} + 1$ $|E| = 16687398718132110018711107079449625895333362908072699315843381931235084311079332175072239976300$ $|E^{tw}| = 16687398718132110018711107079449625895333362908109570637198870580987134010452918684338628453382$ $d = t^{302} + t^{234} + t^{68} + 1$ $|E| = 16687398718132110018711107079449625895333362908096971412645586958872809574836150741413674363026$ $|E^{tw}| = 16687398718132110018711107079449625895333362908085288540396665553349408746696100117997203897811$ $d = t^{35} + t^{24} + t^{23} + t^{12} + 1$ $|E| = 16687398718132110018711107079449625895333362908070638657118314337623711362611354976075794821692$ $|E^{tw}| = 16687398718132110018711107079449625895333362908111631337330421078459846958920895883335080778669$ $d = t^{35} + t^{24} + t^{23} + t^{12} + 1$ $|E| = 16687398718132110018711107079449625895333362908070638657118314337623711362611354976075794821692$ $|E^{tw}| = 16687398718132110018711107079449625895333362908111631337330421078459846958920895883335080778669$ $d = t^{37} + t^{27} + t^{24} + t^{17} + 1$ $|E| = 16687398718132110018711107079449625895333362908080868903217374985690000282514234594944314458708690$ -continued $|E^{tw}| = 1668739871813211001871111070794496258953336290809537963130475394322193580729765591509641955214\overline{7}8$ $d = t^{264} + t^{229} + t^{227} + t^{143} + 1$ $|E^{tw}| = 1668739871813211001871111070794496258953336290809531785703240849181672062252240161034241800\overline{3}6604$ $d = t^{274} + t^{200} + t^{118} + t^{79} + 1$ $|E^{tw}| = 1668739871813211001871111070794496258953336290809531027381673390116630405462592798449068460\overline{2}571782$ $d = t^{274} + t^{200} + t^{118} + t^{79} + 1$ $|E^{tw}| = 1668739871813211001871111070794496258953336290809532973612772361735939600308494416207364\overline{5}93244$ $d = t^{109} + t^6 + t^4 + 1$ $|E^{tw}| = 1668739871813211001871111070794496258953336290808873697942948015048627812501401443290141801\overline{5}142$ $\mathbb{F}_{2^{431}}$:

$d = t^{81} + t^{66} + t + 1$ $|E^{tw}| = 5545339388241629719156828368286167406872874150751633150340959161247577768313503284013096557949109460276731018714522417667693829\overline{1}412$ $d = t^{83} + t^{66} + t^{17} + 1$ $|E^{tw}| = 5545339388241629719156828368286167406872874150751633150340959161211090746290899962028932044924637096222546567003901106389583398\overline{8}6$ $d = t^{109} + t^6 + t^4 + 1$ $|E^{tw}| = 5545339388241629719156828368286167406872874150751633150340959161311882228536204172050516410258575498003250309698819164222488620\overline{6}92$ $d = t^{112} + t^{48} + t^{21} + 1$ $|E^{tw}| = 5545339388241629719156828368286167406872874150751633150340959161146603002686298320109381214157982814386314804146795123093408010\overline{6}06$ $d = t^{42} + t^{24} + t^3 + t + 1$ $|E^{tw}| = 5545339388241629719156828368286167406872874150751633150340959161130337092806146971602038044953833877734193566615352677244483537\overline{5}476$ $d = t^{42} + t^{41} + t^{28} + t^6 + 1$ $|E^{tw}| = 5545339388241629719156828368286167406872874150751633150340959161155114303161032776139517174878219535047692177692087514871061255\overline{8}22$ $d = t^{42} + t^{41} + t^{28} + t^6 + 1$ $|E^{tw}| = 5545339388241629719156828368286167406872874150751633150340959161104511643107998535795206101035123880564768184780755918146871\overline{7}8772$ $d = t^{43} + t^{10} + t^7 + 1$ $|E^{tw}| = 5545339388241629719156828368286167406872874150751633150340959161353973588114503983364691523381434431824796659064858369131209452\overline{5}26$ $d = t^{43} + t^{10} + t^7 + 1$ $|E^{tw}| = 5545339388241629719156828368286167406872874150751633150340959161166884104127775128688833304167913593584746255841947897528929\overline{6}532$ $d = t^{42} + t^{41} + t^{28} + t^6 + 1$ $|E^{tw}| = 5545339388241629719156828368286167406872874150751633150340959161291596820809724979291014293997669530310973812871948083406073\overline{3}4766$ $d = t^{42} + t^{41} + t^{28} + t^6 + 1$ $|E^{tw}| = 5545339388241629719156828368286167406872874150751633150340959161087966067015181231284161886191921497681925846916445067501851\overline{9}1764$ $d = t^{43} + t^{32} + t^{10} + t^7 + 1$ $|E^{tw}| = 5545339388241629719156828368286167406872874150751633150340959161370519164520984369031481438797366162621372249153969780565711\overline{4}39534$ $d = t^{43} + t^{32} + t^{10} + t^7 + 1$ $|E^{tw}| = 5545339388241629719156828368286167406872874150751633150340959161127808378195877079017899633442885671146805522726976589335325\overline{3}859156$ $d = t^{43} + t^{32} + t^{10} + t^7 + 1$ $|E^{tw}| = 5545339388241629719156828368286167406872874150751633150340959161118044741163474945903699342801279911977090125711479556939626\overline{4}2772142$ -continued $d = t^{45} + t^{37} + t^{22} + t^4 + 1$ $|E| = 5545339388241629719156828368286167406872874150751633150340959161149918781895287526336623969059710771809896664714860483078358534612$ $|E^{tw}| = 5545339388241629719156828368286167406872874150751633150340959161120266904469912718193725422471039986376481544209245362255719326904366$ $d = t^{46} + t^{28} + t^{24} + t^3 + 1$ $|E| = 5545339388241629719156828368286167406872874150751633150340959161125581865233753102226433997061596747414104229210780617439637226932$ $|E^{tw}| = 5545339388241629719156828368286167406872874150751633150340959161120266904469912718193725422471039986376481544209245362255719326904366$ $\mathbb{F}_{2^{479}}$:

$d = t^{73} + t^{29} + t^3 + 1$ $|E| = 1560874275157996115690798614896583152874299071332485575429578479812685869415448019717954458818867630469346980324113959778896164309795945594458356$ $|E^{tw}| = 1560874275157996115690798614896583152874299071332485575429578479812685869404317600402351644244624340690479950797292663165518113694923393117731822$ $d = t^{94} + t^{43} + t^{41} + 1$ $|E| = 1560874275157996115690798614896583152874299071332485575429578479812685878010860862813134222545255221084844155094535193191262576490571111350910978122$ $|E^{tw}| = 1560874275157996115690798614896583152874299071332485575429578479812685868600890475730171787761093986267541142166788730376910326622177150215192366$ $\mathbb{F}_{2^{487}}$:

$d = t^{55} + t^{30} + t^3 + 1$ $|E| = 3995838144404470056168444445413525287135820566261116307309972090832047582555560918695632266576298260306292123370108981527103247456607302052686474532$ $|E^{tw}| = 3995838144404470056168444445413525287135820566261116307309972090832047582582990800551660950795568431062357099697111393420220720782478051154553536526$ $d = t^{65} + t^{13} + t^7 + 1$ $|E^{tw}| = 3995838144404470056168444445413525287135820566261116307309972090832047582560437276885990215031973865777846405177666587158717506447596176743814486347$ $d = t^{69} + t^{33} + t^{15} + 1$ $|E^{tw}| = 3995838144404470056168444445413525287135820566261116307309972090832047582577422721864808147352280078838450289189414223874059617297960336002654215826$ $d = t^{74} + t^{48} + t^{27} + 1$ $|E^{tw}| = 3995838144404470056168444445413525287135820566261116307309972090832047582560181862138226693854521544466825345498675533707766156971976964541325977844$ $d = t^{79} + t^{29} + t^{28} + 1$ $|E^{tw}| = 3995838144404470056168444445413525287135820566261116307309972090832047582563604137736853142383930384999486622938032475838357112054281556250843072147$ $\mathbb{F}_{2^{521}}$:

$d = t^{66} + t^{29} + t^{28} + 1$ $|E| = 6864797660130609714981900790081393217269435300143305409393446345918339765708894395032898316224239626539434197786131122162640689857978005132240328602782204$

-continued $|E^{tw}| = 6864797660130609714498190079908139321726943530014330540939446345918554318339765501480561599149128667032805318858517558495208133530957530962001581625362733210 2$ $d = t^{75} + t^{62} + t^{6} + 1$ $|E| = 6864797660130609714498190079908139321726943530014330540939446345918554318339765644325618371620330136782268291990348988973602935351114141960457442165751243321 2$ $|E^{tw}| = 6764797660130609714498190079908139321726943530014330540939446345918554318339765566098893556111960774213190970287947182633821462248829186802057363492471681094$ $d = t^{103} + t^{56} + t + 1$ $|E| = 6864797660130609714498190079908139321726943530014330540939446345918554318339765628033712159057973545582840523383252706840843832850583729885756382667271350 48028$ $|E^{tw}| = 6864797660130609714498190079908139321726943530014330540939446345918554318339765930087390337525255545516705402844576910319898606090410602990495097898550950662 78$ $d = t^{37} + t^{35} + t^{33} + 1$ $|E| = 6864797660130609714498190079908139321726943530014330540939446345918554318339765171644079172651216602786301592847605782778251650489209112087036858053848931 0652$ $|E^{tw}| = 6864797660130609714498190079908139321726943530014330540939446345918554318339766038780432755481074308209157669430690388829172747110734216674794604374080 3654$ $d = t^{50} + t^{31} + t^{28} + t^{19} + 1$ $|E| = 6864797660130609714498190079908139321726943530014330540939446345918554318339765667219452354459510060107371029241756511300875588279317904542841436802100187169 88$ $|E^{tw}| = 6864797660130609714498190079908139321726943530014330540939446345918554318339765543205059573672780309921748969860731058598668514806764283334100437672211397 318$ $\mathbb{F}_{2^{569}}$ :

$d = t^{56} + t^{45} + t^{41} + 1$ $|E| = 1932268761508629172347594546599367214946366485321749993286176527257595711447802122680324312135204225690994105833596555418474932773179050848492246503400252208800 67199309308$ $|E^{tw}| = 1932268761508629172347594546599367214946366485321749993286176257257595711447802122681613353684021553936420544812521635517585383725082570893684023270555278169136155141 18$

The invention claimed is:

1. A cryptographic method to be implemented on a 32-bit or 64-bit hardware architecture associated with an Internet of Things (IoT) device, said cryptographic method being defined on a binary Edwards curve expressed as $d(x+x^2+y+y^2)=(x+x^2)(y+y^2)$ in the affine plane, by a binary extension field $F_{2^m}[t]=F_2[X]/(H(X))$ in which $F_2[X]$ is the polynomial ring with coefficients in $F_2$ and $H(X)$ is an irreducible polynomial of $F_2[X]$ with degree m, the parameter d of the curve being an element of $F_{2^m}[t]$, the set of points on the curve being provided with a law conferring an additive group structure thereon, $E_d(F_{2^m})$, said method using at least one cryptographic primitive in which an integer k is transformed into kG in which G is a point in $E_d(F_{2^m})$, called the generating point, wherein said method comprises processing a message M associated with the IoT device, in which $M \in E_d(F_{2^m})$, wherein for an implementation of said method using the 32-bit or 64-bit hardware architecture associated with the IoT device, the binary extension field is one of the following fields:

$F_{2^{257}}[t]=F_2[X]/(X^{257}+X^{65}+1)$;
$F_{2^{431}}[t]=F_2[X]/(X^{431}+X^{303}+X^{239}+X^{111}+1)$;
$F_{2^{487}}[t]=F_2[X]/(X^{487}+X^{295}+X^{167}+X^{39}+1)$;
$F_{2^{569}}[t]=F_2[X]/(X^{569}+X^{441}+X^{313}+X^{121}+1)$; and for an implementation using the 32-bit hardware architecture associated with the IoT device, the binary extension field can also be chosen from among:

$F_{2^{223}}[t]=F_2[X]/(X^{223}+X^{159}+1)$;
$F_{2^{479}}[t]=F_2[X]/(X^{479}+X^{255}+1)$
$F_{2^{521}}[t]=F_2[X]/(X^{521}+X^{489}+1)$;

the parameter d of the binary Edwards curve on each of these binary extension fields being given in the Appendix, and wherein said generating point G, with affine coordinates $(G_x, G_y)$, has a differential coordinate $w(G)=G_x+G_y$ the inverse of which $$\frac{1}{w(G)}$$

satisfies:

- for $\mathbb{F}_{2^{223}}[t]$: $\frac{1}{w(G)} = t^{32} + 1$;

- for $\mathbb{F}_{2^{257}}[t]$: $\frac{1}{w(G)} = t^{192}$;

- for $\mathbb{F}_{2^{313}}[t]$: $\frac{1}{w(G)} = t^{64} + 1$;

- for $\mathbb{F}_{2^{431}}[t]$: $\frac{1}{w(G)} = t^{64} + 1$;

- for $\mathbb{F}_{2^{479}}[t]$: $\frac{1}{w(G)} = t^{64} + 1$;

- for $\mathbb{F}_{2^{487}}[t]$: $\frac{1}{w(G)} = t^{64} + 1$;

- for $\mathbb{F}_{2^{521}}[t]$: $\frac{1}{w(G)} = t^{32} + 1$;

- for $\mathbb{F}_{2^{569}}[t]$: $\frac{1}{w(G)} = t^{64} + 1$.

2. The cryptographic method on a binary Edwards curve according to claim 1, wherein the parameter d of the binary Edwards curve is given by:

for $F_{2^{223}}[t]$: $d=t^{64}+t^{36}+t^5+1$;
for $F_{2^{257}}[t]$: $d=t^{65}+t^{31}+t^{14}+1$;
for $F_{2^{313}}[t]$: $d=t^{38}+t^{33}+t^{28}+1$;
for $F_{2^{431}}[t]$: $d=t^{83}+t^{66}+t^{17}+1$;
for $F_{2^{479}}[t]$: $d=t^{73}+t^{29}+t^3+1$;
for $F_{2^{487}}[t]$: $d=t^{69}+t^{33}+t^{15}+1$;
for $F_{2^{521}}[t]$: $d=t^{66}+t^{29}+t^{28}+1$;
for $F_{2^{569}}[t]$: $d=t^{56}+t^{45}+t^{41}+1$.

3. The cryptographic method on a binary Edwards curve according to claim 2, wherein the affine coordinates $(G_x, G_y)$ of the generating points are given as follows, in hexadecimal notation:

for $F_{2^{223}}[t]$:
$G_x$=205bfedd 71b0b0fd feb3345a f71cc721 790e83c4 b88094e9 a63f6d43
$G_y$=205bfedd f1b0b0fd 7eb3345a f71cc721 790e83c4 b8809 4e9 a63f6d43 for $F_{2^{253}}[t]$:
$G_x$=1 6b46e24a a4b12ab2 289fcd34 17615387 810f083f 43419d8c ae38ad9a c640d960
$G_y$=1 6b46e24a a4b12aba 289fcd34 17615383 810f083f 43419d8e ae38ad9a c640d968 for $F_{2^{313}}[t]$:
$G_x$=15c67e3 024c7c27 466e72a3 391256e9 a729fc15 8092053d 89087c0f 38408b21 4b0ade57 363ea938
$G_y$=15c67e3 024c7c27 446e72a3 391256e9 a529fc15 8092053d 8b087c0f 38408b21 4b0ade57 363ea938 for $F_{2^{431}}[t]$:
$G_x$=4e17 65c1f2f6 140db17d 5ef2f14c 59a38a93 e5b65ba9 acca547b f2cc34f3 d55bd85c cf4daeaf 7ca1beca a8ee877b 01f8d8ac ae12b210
$G_y$=4e17 65c1f2f6 140d317d 5ef2f14c 59a30a93 e5b65ba9 acca547b f2cc34f3 d55585c cf4daeaf 7ca13eca a8ee877b 01f8d8ac ae12b210 for $F_{2^{479}}[t]$:
$G_x$=7bdd9f19 e11e888e 80d7c093 092d208b 4fe996e8 fcbdffa2 8cc90173 ece2c436 73f1372e 975ba9dc d3a06332 abf15dbe 9b679f6c 63e30b88 4ab93272
$G_y$=3bdd9f19 a11e888e 40d 7c093 492d208b 8fe996e8 bcbdffa2 4cc90173 ece2c436 f3f1372e 175ba9dc 53a06332 2bf15dbe 1b679f6c e3e30b88 cab93272 for $F_{2^{487}}[t]$:
$G_x$=33 9b843c53 c409543f 396d39e5 7efde813 f06e3099 735004b9 99b15776 a75a4c3a 22dcaf1e 91e261fe 479b89a6 4d651039 28195d72 7bd3d157 735b2071
$G_y$=33 9b843c53 c40954bf 396d39e5 7efde893 f06e3099 73500439 99b15776 a75a4c3a 22dcaf1e 91e261fe 479b89a6 4d6510b9 28195d72 7bd3d1d7 735b2071 for $F_{2^{521}}[t]$:
$G_x$=16b 369b497b 805e6199 a342909a a4608cdc ecb10e09 88ba73eb 1f118603 9c8b1f6d 2a9db39b 1302d29d 9d449b9a a459cc5d 6bbb4e33 a1eb8fcc 056ce724 cde5aaa8
$G_y$=16b 369b4b7b 805e6199 a342909a a4608cdc ecb10e09 88ba73eb 1f118603 9c8b1f6d 2a9db39b 1302d29d 9d449b9a a459cc5d 6bbb4e33 a1eb8fcc 056ce724 cde5aaa8 for $F_{2^{569}}[t]$:
$G_x$=195b22b 2864ee08 dd456bab 1a95cdd8 c7e3fd33 0fddf630 f9c3bb5c 33f062b3 41c919c6 bb4cbf1d 4335a344 ed023b31 9585ea0e 16f03453 cc5ba9a8 6a4b28b1 6e1c72ad 75f1411f $G_y$=195b22b 2864ee08 df456bab 1a95cdd8 c5e3d33 0fddf630 f9c3bb5c 33f062b3 41c919c6 bb4cbf1d 4135a344 ed023b31 9785ea0e 16f03453 ce5ba9a8 6a4b28b1 6e1c72ad 75f1141f.

\* \* \* \* \*